United States Patent
Ueki et al.

[11] Patent Number: 4,890,517
[45] Date of Patent: Jan. 2, 1990

[54] SHIFT VALVE FOR AUTOMATIC AUTOMOTIVE TRANSMISSION OR THE LIKE

[75] Inventors: Akihiro Ueki, Zama; Kazuhiko Sugano, Yokohama, both of Japan

[73] Assignee: Nissan Motor Co., Ltd., Yokohama, Japan

[21] Appl. No.: 185,404

[22] Filed: Apr. 25, 1988

[30] Foreign Application Priority Data

Jun. 15, 1987 [JP] Japan ................... 62-147141

[51] Int. Cl.4 ............................................. B60K 41/06
[52] U.S. Cl. ........................................ 74/868; 74/867
[58] Field of Search ......................... 74/868, 867, 865

[56] References Cited

U.S. PATENT DOCUMENTS

| 4,334,442 | 6/1982 | Iwanaga et al. | 74/868 X |
| 4,455,892 | 6/1984 | Sakakibara | 74/867 X |
| 4,537,095 | 8/1985 | Morisawa | 74/868 |
| 4,587,887 | 5/1986 | Shibayama et al. | 74/868 X |
| 4,609,013 | 9/1986 | Takahashi | 74/865 X |

FOREIGN PATENT DOCUMENTS

| 56-147947 | 11/1981 | Japan. | |
| 81556 | 5/1985 | Japan | 74/868 |

Primary Examiner—Leslie A. Braun
Assistant Examiner—William Gehris
Attorney, Agent, or Firm—Foley & Lardner, Schwartz, Jeffery, Schwaab, Mack, Blumenthal & Evans

[57] ABSTRACT

A spring is disposed between first and second reciprocal spool valve elements and arranged to bias the same apart when the level of throttle pressure falls to a low level. The first valve is arranged to control the communication between a source of line pressure and a friction element or elements and is subject to the effects of the governor pressure. The second of the spool valve elements is subject to the effect of throttle pressure and a second spring which biases the second element toward the first one.

5 Claims, 3 Drawing Sheets

4,890,517

SHIFT VALVE FOR AUTOMATIC AUTOMOTIVE TRANSMISSION OR THE LIKE

BACKGROUND OF THE INVENTION

1. Field of the Invention

The present invention relates generally to automatic automotive transmissions and more specifically to a shift valve for such a type of transmission.

2. Description of the Prior Art

FIG. 5 shows a shift valve of the nature disclosed in JP-A-56-147947. This shift valve as shown, has three spools 50, 52 and 54 disposed in a single bore.

A spring 56 is disposed between one end of the bore and an end of the spool 54. Governor pressure $P_G$ (pressure indicative of vehicle speed) is supplied to the bore through conduit 58 while throttle pressure $P_{TH}$ (indicative of engine load) is supplied through conduit 60. In accordance with the forces developed by the governor pressure, throttle pressure and the spring the spools assume positions which determine the communication between conduits 62 and 64. Conduit 62 communicates with a source of line pressure while conduit 64 is arranged to communicate with a friction element or elements 66 such as clutches and brakes of a planetary gear type transmission. Conduit 64 also communicates with a port 68 which is controlled by the second spool valve element 52.

The operational characteristics of this valve arrangement are shown in FIG. 6. In this figure the solid line trace denotes upshift characteristics while the broken line denotes those which determine the downshifting.

In the above described arrangement as the area of the third spool 56 on which the throttle pressure acts is relatively small, the force of the spring biases the third spool into engagement with the end of the second spool 52 when the level of the throttle pressure is low. When the throttle pressure increases to a higher level the second and third spool valve elements 52, 54 separate and effect a change in the solid line shift characteristics shown in FIG. 6.

However, with this prior art arrangement there is no throttle valve pressure hysteresis separating the level at which the upshift and downshift characteristics undergo change due to the separation/abutment of the second and third spool valve elements 52, 54. Accordingly, hunting is not prevented and a good shift feeling is not produced. In this connection the effective area of the first shift valve 50 which is acted on by the governor pressure $P_G$, is arranged to change depending on the shift position of the spool. Moreover, when the first spool valve element is in its downshift position the force produced by the hydraulic pressure prevailing in conduit 64 and port 68 have an influence on the movement of the valve element. However, as the upshift and downshift lines undergo change at the same throttle pressure ($F/A_{TH}$) it is o difficult to produce the appropriate hysteresis.

For example, as shown in FIG. 6, if the throttle pressure value at which the downshift changeover point is increased, the shift lines tend to separate while conversely, if the value at which the changeover point occurs is reduced the shift lines approach one and other and the hysteresis in the throttle pressure direction becomes insufficient.

SUMMARY OF THE INVENTION

It is an object of the present invention to provide a shift valve which exhibits improved upshift/downshift hysteresis characteristics particularly with respect to changes in throttle pressure.

It is a further object of the present invention to provide a shift valve of the above proposed nature which is more compact than the prior art.

More specifically, a first aspect of the present invention comes in the form of a hydraulic control system having a friction element and which features: a shift valve comprising: means defining a valve bore; a first spool element reciprocatively disposed in the valve bore, the first spool valve element being arranged to control the communication between the friction element and a source of line pressure; a second spool valve element reciprocatively disposed in the valve bore; a first spring, the first spring being disposed between the first and second spool valve elements and arranged to bias the same apart; a second spring, the second spring being disposed in the valve bore and arranged to bias the second spool valve element toward the first one; a throttle pressure port formed in the valve bore, the throttle pressure port being arranged to admit throttle pressure into the valve bore in a manner which produces a bias which act in the same direction as the second spring.

A second aspect of the present invention is deemed to come in the form of a hydraulic control system for an automotive vehicle, which system includes a source of line pressure; a source of governor pressure; a source of throttle pressure; a friction element; and a shift valve for controlling the communication between the source of line pressure and the friction element, the shift valve comprising: a valve bore; a first spool valve element reciprocatively disposed in the valve bore, the first valve element having first, second and third lands thereon, the first spool valve element controlling the communication between ports which communicate with the source of line pressure and the friction elements; a second spool valve element reciprocatively disposed in the valve bore, the second spool valve element having first and second lands thereon; a first spring, the first spring being disposed between the first and second spool valve elements and arranged to bias the same apart; a second spring the second spring being disposed in the valve bore and arranged to engage the second spool valve element, the second spring being arranged to bias the second spool valve element toward the first one; a throttle pressure port formed in the valve bore, the throttle pressure port being communicated with the source of throttle pressure and arranged to admit the throttle pressure into the valve bore in manner that a bias is produced which acts in the same direction as the second spring; first and second governor pressure ports formed in the valve bore, the first and second governor pressure ports communicating with the source of governor pressure and with the valve bore in a manner than when the first spool valve element assumes a downshift position, governor pressure is admitted into a chamber defined between the end of valve bore and the first land of the first spool valve element through the first governor pressure port and into a chamber defined between the first and second lands of the first spool valve element, and when the first spool valve element assumes an upshift position communication between the source of governor pressure and the chamber defined between the first and second lands of the first spool valve element through the second governor pressure port is cut off.

DETAILED DESCRIPTION OF THE PREFERRED EMBODIMENTS

Figure 1:
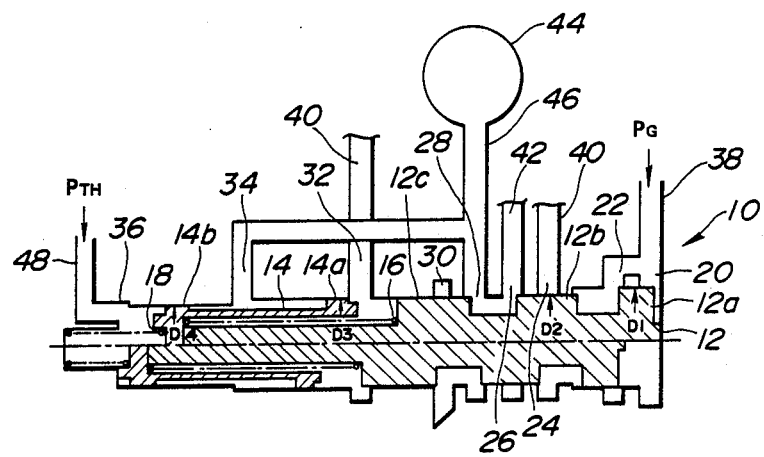
FIG. 1 is a sectional elevation showing a shift valve according to a first embodiment of the present invention.

FIG. 1 shows a first embodiment of the present invention. In this arrangement a shift valve 10 includes first and second spool valve elements 12 and 14 reciprocatively disposed in a single valve bore.

A spring 16 operatively arranged between the two spools.

In this instance the second spool valve element 14 is formed in a manner to have a large diameter coaxial bore therein in which an elongate portion of the first spool valve element 12 is received. As shown, spring 16 is disposed within the bore and arranged to engage the blind end of the bore at one and and a land (12c) of the first spool 12.

A second spring 18 is arranged between the axial end of the second spool valve element 14 and the end of the bore.

The first spool valve element 12 is formed with 3 lands - 12a, 12b and 12c. These lands have diameters D1, D2 and D3 respectively. In this instance D1 is larger than D2 and D3 which are equal in value. The second spool 14 has two lands 14a and 14b. These lands have diameters D3 and D4 respectively. In this case D4 is larger than D3, and as will be noted D3 is equal to D2.

The valve bore is formed with ports 20, 22, 24, 26, 28, 30, 32, 34 and 36. Ports 20 and 22 are supplied with governor pressure PG through conduit 38. Port 24 communicates with conduit 40. This conduit is normally drained and supplied with hydraulic pressure during kickdown. As will be noted conduit 40 also communicates with port 32. Port 26 is supplied with line pressure via conduit 42. Port 28 communicates with a friction element which in this case takes the form of a clutch 44 via conduit 46. Conduit 46 also communicates with port 34. Port 30 is normally drained. Port 36 receives throttle pressure Pth through conduit 48.

The above arrangement is such that when the throttle pressure exceeds a predetermined value (which will become more clearly understood hereinafter, spring 16 is compressed and the first and second spool valve members are brought into contact with one and other and thus act as a single unit. Under these conditions in accordance with the pressures prevailing in ports 34, 36 and 22 produce a force which biases the spool valve elements 12, 14 to the right as seen in the drawings (downshift position) while the pressure in port 20 produces a bias which acts in the opposite direction (viz., toward the upshift position).

When the first spool valve element 12 is in its upshift position (lower half of the spool section) line pressure is prevented from being supplied to the friction element from conduit 46 and to port 34, while the port 22 is closed preventing the application of governor pressure against the inboard face of the land 12a. Accordingly when the valve changes from its upshift position to the downshift one and changes from its downshift position to the upshift one, the equilibrium established between the hydraulic pressures changes. Viz., in the and downshift positions:

$$A_{TH}=(\pi/4)D4^2$$

$$A_{GD}=(\pi/4)D1^2$$

$$A_{GU}=(\pi/4)D2^2$$

$$A_L=(\pi/4)(D3^2-D4^2).$$

However, in the downshift position $$P_G \cdot A_{GU} = A_{TH} \cdot P_{TH} + A_L \cdot P_L$$

while in the upshift position $$P_G \cdot A_{GU} = A_{TH} \cdot P_{TH}$$

Figure 2:
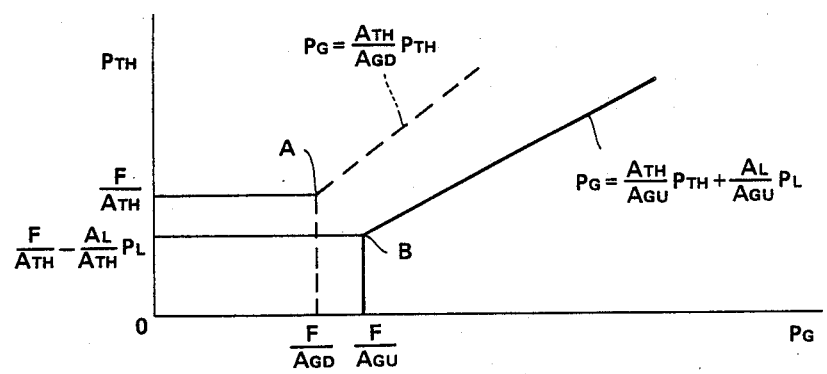
FIG. 2 is a chart showing in terms of throttle and governor pressure the shift characteristics derived with the first embodiment.

As shown in FIG. 2 the above relationships produce the beneficial result wherein the points A and B on the upshift and downshift lines are shifted to different throttle pressure levels.

When the throttle pressure $P_{TH}$ reduces at port 36, the first and second spool valve elements 12 and 14 separate under the bias of spring 16 and the effect of the throttle pressure on the shift lines disappears.

Under the these conditions the force acting on the second spool valve element 14 in the downshift position is given by:

$$F = A_{TH} \cdot P_{TH} + A_L \cdot P_L$$

while when in the upshift position $$F = A_{TH} \cdot P_{TH}$$

Therefore, the upshift changeover point B occurs at a throttle pressure of $F/A_{TH}-(A_L/A_{TH}) \cdot P_L$ while the corresponding changeover point A on the downshift line occurs at a throttle pressure of $F/A_{TH}$.

Thus, as will be appreciated from FIG. 2 with the instant embodiment the portion of the shift lines located in the low load region are suitably located while the changeover point B on the upshift line is separated from the changeover point A on the downshift line and occurs at a lower throttle pressure. Further, the upshift and downshift lines are separated by a suitable vehicle speed difference to provide hysteresis in the direction of the horizontal axis.

Figure 3:
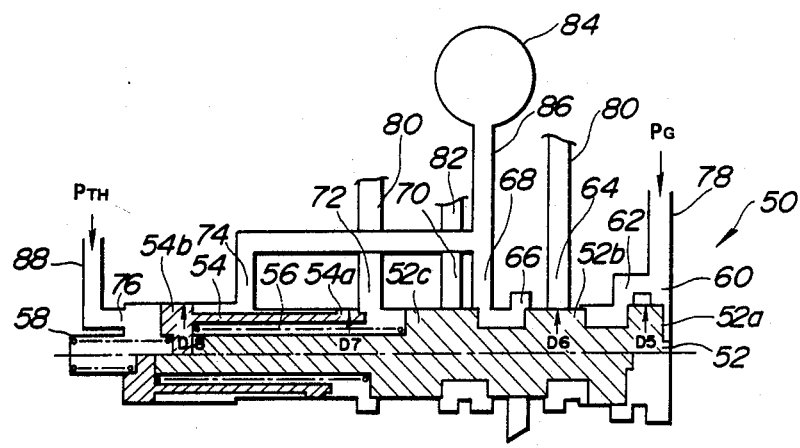
FIG. 3 is a sectional elevation showing a second embodiment of the present invention.
Figure 4:
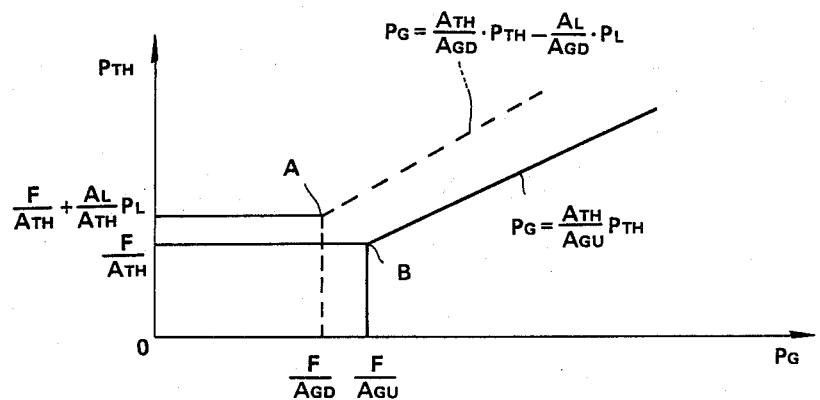
FIG. 4 is a chart showing in terms of throttle and governor pressure, the shift characteristics obtained with the second embodiment of the present invention.
Figure 5:
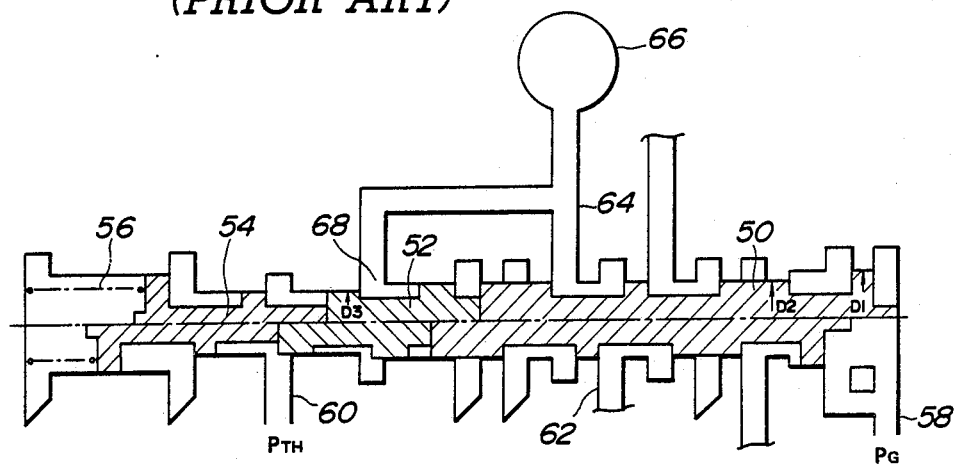
FIG. 5 is a sectional elevation of the prior art arrangement discussed in the opening paragraphs of the instant disclosure.
Figure 6:
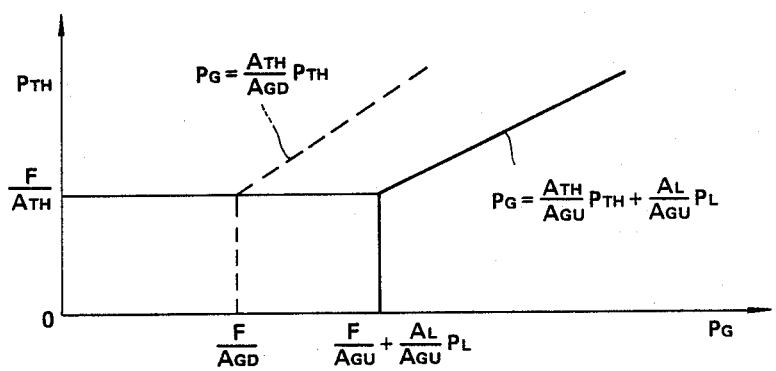
FIG. 6 is a chart showing the shift characteristics derived with the prior art arrangement.

FIGS. 3 and 4 shows a second embodiment of the present invention. This embodiment differs from the first one in that in this case the friction element (clutch) is arranged to be engaged in the upshift position.

The embodiment includes a shift valve 50 which includes first and second spool valve elements 52 and 54 which are reciprocatively disposed in the same valve bore. Springs 56 and 58 are disposed in positions similar to springs 16 and 18 of the first embodiment.

The first spool valve element 5 has three lands 52a, 52b and 52c. The diameters of lands 52a and 52b are respectively D5 and D6. D5 is larger than D6.

The second spool valve element has two lands 54a and 54b having diameters D6 and D7 respectively. D8 is larger than D7 while D6 and D7 have the same value.

The valve bore is formed with ports 60, 62, 64, 66, 68, 70, 72, 74 and 76.

The lands on the first and second spool valve elements 52 and 54 are arranged as shown in FIG. 3.

Ports 60 and 62 are supplied with governor pressure via conduit 78. Port 64 is connected with conduit 80 which is drained except under kickdown. As shown, conduit 80 also communicates with port 72. Port 66 acts as a drain while port 68 is connected with clutch 84 via conduit 86. Port 74 also communicates with conduit 86.

Line pressure is supplied to port 70 via conduit 82 while throttle pressure is supplied to port 76 through conduit 88.

The above described arrangement operates as follows. When the throttle pressure is above a predetermined level which will be disclosed hereinlater, spring 56 is compressed an the first and second spool valve elements abut each other and move as a single element. Under these conditions, the hydraulic pressure prevailing in ports 76, 62 and 74 produces a force which tends move the spool valve elements to the right as seen in the drawings. On the other hand, the pressure prevailing in port ports 20 and 74 cooperate to produce a bias which acts in the opposite direction.

When the first spool valve element 52 assumes its downshift position (see lower spool portion) port 62 is opened and governor pressure is admitted to the space defined between lands 52 and 52b. At the same time port 74 is drained. On the other hand, when the first spool valve element assumes its upshift position, hydraulic pressure is prevented from entering port 62 while at the same time conduit 86 and port 74 become pressurized with line pressure. According, when the first spool valve element 52 is moved from the downshift position to the upshift one and vice versa, a difference in the equilibrium established occurs. When in both of the upshift and downshift positions:

$$A_{TH} = (\pi/4) D8^2$$

$$A_{GD} = (\pi/4) D5^2$$

$$A_{GU} = (\pi/4) D6^6$$

$$A_L = (\pi/4)(D8^2 - D7^2)$$

In the upshift position $$P_G \cdot A_{GU} = A_{TH} \cdot P_{TH}$$

while in the downshift position
$$A_{GD} \cdot P_G = A_{TH} \cdot P_{TH} - A_L \cdot P_L$$

Accordingly, the shift characteristics shown in FIG. 4 are developed. When the throttle pressure in port 76 reduces, the spring 56 separates the first and second spool valve elements 52 and 54 and the effect of throttle pressure disappears. Under these conditions the second spool valve element 54 when in the upshift position is subject to the following force:

$$F = A_{TH} \cdot P_{TH}$$

while in the downshift position is subject to $$F = A_{TH} \cdot P_{TH} - A_L \cdot P_L$$

Therefore, with the second embodiment the changeover points in the upshift and downshift lines occur at throttle pressures of $F/A_{TH}$ and $F/A_{TH} + (A_L/A_{TH}) \cdot P_L$. Thus, as shown in FIG. 4 in the low throttle pressure region a separation of the shift lines occurs wherein the change over point A in the downshift line occurs at a higher throttle pressure than the corresponding point B in the upshift line but at a lower governor pressure than the point B.

Accordingly, suitable hysteresis characteristics are provided in both the vertical and horizontal directions.

What is claimed is:

1. In a hydraulic control system having a friction element, a shift valve comprising:
    means defining a valve bore;
    a first spool valve element reciprocatively disposed in said bore, said first spool valve element being arranged to control the communication between a first port and a source of line pressure, said first port being arranged to communicate with said friction element, said first spool having a first land which is exposed to chamber means into which governor pressure is supplied;
    a second spool valve element reciprocatively disposed in said bore, said second spool valve element having second and third lands thereon, said second and third lands having different diameters in a manner to define a pressure differential area;
    a second port, said second port being arranged to communicate with said bore in a manner to constantly communicate with the space defined in said bore between said second and third lands, said second port constantly communicating with said first port;
    a first spring, said first spring being disposed between said first and second spool valve elements and arranged to bias said first and second spool valve elements apart;
    a second spring, said second spring being disposed in said valve bore and arranged to bias said second spool valve element toward said first spool valve element; and
    a third port, said third port being arranged to admit throttle pressure into said bore in a manner to act on said second spool valve element and to bias said second spool valve element toward said first spool valve element.

2. In a hydraulic control system for an automotive vehicle which includes a source of line pressure, a source of governor pressure, a source of throttle pressure, a friction element, and a shift valve for controlling the communication between the source of line pressure and the friction element, the shift valve comprising:
    a valve bore;
    a first spool valve element having first, second and third lands thereon, said first spool valve element controlling the communication between the first port which communicates with the source of line pressure and a second port which communicates with said friction element;
    a second spool valve element reciprocatively disposed in said bore, said second spool valve element having fourth and fifth lands thereon, said fourth and fifth lands having different diameters;

a first spring, said first spring being disposed between said first and second spool valve elements and arranged to bias said first and second spool valve elements apart;

a second spring, said second spring being disposed in said valve bore and arranged to engage said second spool valve element, said second spring being arranged to bias said second spool valve element toward said first spool valve element;

a third port formed in said bore, said third port being arranged to communicate with the source of throttle pressure, said third port being arranged to admit the throttle pressure into said bore in a manner such that it produces a bias which tends to move said second spool valve element toward said first spool valve element; and a fourth port, said fourth port being in constant fluidly communicate with said second port and formed in said bore so as to constantly communicate with said bore at a location between said fourth and fifth lands of said second spool valve element.

3. The shaft valve of claim 1, further comprising:

fifth and sixth ports, said fifth and sixth ports communicating with the source of governor pressure and arranged to open into said bore in a manner wherein when said first spool valve element assumes a first position, governor pressure is admitted into a first chamber defined between the end of the valve bore and said first land through said fifth port and into said first chamber and when said second spool valve element assumes a second position, governor pressure is admitted into a second chamber defined between said first and second lands.

4. The shift valve of claim 9 wherein said fourth land is arranged closer to said first spool valve element than said fifth land and said fourth land has a diameter which is larger than the diameter of said fifth land.

5. The shift valve of claim 2 wherein said fourth land is arranged closer to said first spool valve element than said fifth land and said fourth land has a diameter which is smaller than the diameter of said fifth land.

* * * * *